United States Patent
Hind et al.

(10) Patent No.: US 6,585,778 B1
(45) Date of Patent: Jul. 1, 2003

(54) ENFORCING DATA POLICY USING STYLE SHEET PROCESSING

(75) Inventors: John Raithel Hind, Raleigh, NC (US); David B. Lindquist, Raleigh, NC (US); Brad B. Topol, Raleigh, NC (US); Ajamu A. Wesley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/385,899

(22) Filed: Aug. 30, 1999

(51) Int. Cl.[7] .............................................. G06F 17/27
(52) U.S. Cl. ..................... 715/513; 715/507; 715/522
(58) Field of Search ................................ 707/505, 507, 707/508, 513, 522; 715/505, 507, 508, 513, 522

(56) References Cited

U.S. PATENT DOCUMENTS

| | | | | |
|---|---|---|---|---|
| 5,761,662 A | * | 6/1998 | Dasan | 707/10 |
| 6,006,242 A | * | 12/1999 | Poole et al. | 707/531 |
| 6,154,738 A | * | 11/2000 | Call | 705/20 |
| 6,249,794 B1 | * | 6/2001 | Raman | 707/500 |
| 6,401,094 B1 | * | 6/2002 | Stemp et al. | 707/10 |
| 6,424,979 B1 | * | 7/2002 | Livingston et al. | 707/203 |
| 6,457,030 B1 | * | 9/2002 | Adams et al. | 707/513 |

OTHER PUBLICATIONS

Eric Ladd and Jim O'Donnell et al., Platinum Edition Using HTML 4, XML and Java™ (Que: 1999, first printing Dec. 1998) ("Using HTML4, XML, and Java"), pp. 309–315.*
H.M. Deitel and P.J. Deitel, C++ How to Program (Prentice Hall: 1994), pp. 179–180.*

* cited by examiner

Primary Examiner—Heather R. Herndon
Assistant Examiner—Charles A. Bieneman
(74) Attorney, Agent, or Firm—Jeanine S. Ray-Yarletts; Marcia L. Doubet

(57) ABSTRACT

Enforcing data policy using style sheet processing. A Document Type Definition (DTD) associated with an Extensible Markup Language document is modified to specify a reference to stored data policy to be applied to document elements. Each data element may specify a different data policy. This technique uses minimal network transmission overhead, as the policy itself is not transmitted through the network until the DTD reaches the node where the data policy will be applied. Programming code implementing the data policy is then retrieved, using the references, by an Extensible Stylesheet Language (XSL) processor instrumented according to the present invention. Data policy is preferably enforced by overriding the existing XSL "value-of" method. DTD information describing a document element may be suppressed from a DTD being generated for the output document of the data policy enforcement process, providing privacy protection for the details of the associated policy.

33 Claims, 6 Drawing Sheets

```
300
                           311   312
        <?xml encoding="UTF-8" ?>
    310 <!ENTITY % internalonly "ldap://acmebooks.com/cn=iuo1,ou=policy,o=acme">
321 320 <!ENTITY % restricted "ldap://acmebooks.com/cn=rv1,ou=policy,o=acme">    322
331 330 <!ENTITY % unrestricted "ldap://acmebooks.com/cn=ur1,ou=policy,o=acme">  332
        <!ELEMENT record (title,author,stock,retailprice,cost)*> 340
        <!ELEMENT title (#PCDATA)>
350 352 <!ATTLIST title  353   354       355
        datapolicy:url CDATA #FIXED %unrestricted;> 356
        <!ELEMENT author (#PCDATA) >
360     <!ATTLIST author                 365
        datapolicy:url CDATA #FIXED %unrestricted;>
        <!ELEMENT retailprice (#PCDATA) >
370     <!ATTLIST retailprice            375
        datapolicy:url CDATA #FIXED %unrestricted;>
        <!ELEMENT cost (#PCDATA)
380     <!ATTLIST cost                   385
        datapolicy:url CDATA #FIXED %internalonly;>
        <!ELEMENT stock (#PCDATA) >
390     <!ATTLIST stock                  395
        datapolicy:url CDATA #FIXED %restricted;>
```

FIG. 3

```
                                        311  312
                    <?xml encoding="UTF-8" ?>
321     310 <!ENTITY % internalonly "ldap://acmebooks.com/cn=iuo1,ou=policy,o=acme">
        320 <!ENTITY % restricted "ldap://acmebooks.com/cn=rv1,ou=policy,o=acme">      322
331     330 <!ENTITY % unrestricted "ldap://acmebooks.com/cn=ur1,ou=policy,o=acme">    332
            <!ELEMENT record (title,author,stock,retailprice,cost)*> 340
            <!ELEMENT title (#PCDATA)>
350  352   <!ATTLIST title  351  /354   355
            353
           datapolicy:url CDATA #FIXED %unrestricted;> 356
            <!ELEMENT author (#PCDATA) >
360        <!ATTLIST author                     365
           datapolicy:url CDATA #FIXED %unrestricted;>
            <!ELEMENT retailprice (#PCDATA) >
370        <!ATTLIST retailprice                375
           datapolicy:url CDATA #FIXED %unrestricted;>
            <!ELEMENT cost (#PCDATA)
380        <!ATTLIST cost                       385
           datapolicy:url CDATA #FIXED %internalonly;>
            <!ELEMENT stock (#PCDATA) >
390        <!ATTLIST stock                      395
           datapolicy:url CDATA #FIXED %restricted;>
```

```
<? xml version="1.0" encoding="UTF-8" ?>                                          405
<!DOCTYPE record SYSTEM "ldap://acmebooks.com/cn=catalog,ou=dtd,o=acme?xmlProperty">
<title>
War of the Roses      410
</title>
<author>
Smith, Bob            420
</author>
<cost>
4.20                  430
</cost>
<retailprice>
39.50                 440
</retailprice>
<stock>
28 ──── 451           450
</stock>
```

ENFORCING DATA POLICY USING STYLE SHEET PROCESSING

BACKGROUND OF THE INVENTION

1. Field of the Invention

The present invention relates to a computer system, and deals more particularly with a method, system, and computer program product for enforcing data policy using style sheet processing.

2. Description of the Related Art

"Data policy", as used herein, refers to the procedures and rules used to control access to stored data. Prior to the advent of distributed network computing, data policy was something left to the data source to enforce, and often was limited to a simple access control check based on the identity of the requester. (As used herein, "data source" refers to an application program executing at an application server from which the data is available, servicing user requests for the stored data.) With the move toward highly distributed networks of applications, devices, and users, this simplistic model for access control is no longer acceptable. This is due to the fact that as applications have become more decentralized, it often becomes unclear what exactly may be the source of particular data. For example, it may be possible that the data was originally obtained by gathering portions thereof from a variety of disparate sources. In this case, what appears to be the data source may be simply the data gatherer instead of the data creator. Furthermore, this data may go through some form of transformation, and because of this, the perceived source of the transformed data may be the data transformer instead of the true data source. In a similar fashion, the true target for the data may be unclear as the data flows through intermediate points (such as gateways) in the network. Because of these factors and the complexity they add, the need to enforce usage policies using more sophisticated techniques than simple access control has become critical.

To illustrate this problem, suppose a target user "Sam" requests some data such as "contact information for Smith" from a data source such as an employee directory. In this scenario, Sam's request is sent from his client machine to a server executing an application program which responds to requests for information from the data source (i.e. this employee directory). This application program enforces data policy to decide what, if any, contact information Sam should see about Smith. In the existing art, pertinent factors might be whether Sam has provided a valid password; whether Sam works within the company for which the employee directory is maintained; whether Sam works in a particular department of this company (such as the human resources department) that gives Sam broader access to Smith's information; etc. In this example, if Sam provides a valid password and is an employee not working in human resources, then one type of filtering process may be applied to Smith's information (filtering out all personal and salary data, for example) before the result is delivered to Sam; if Sam works in the human resources department, then a different filter (or perhaps no filter) is applied to Smith's information. Techniques for controlling access in this manner are well known. Sam has provided a valid password; whether Sam works within the company for which the employee directory is maintained; whether Sam works in a particular department of this company (such as the human resources department) that gives Sam broader access to Smith's information; etc. In this example, if Sam provides a valid password and is an employee not working in human resources, then one type of filtering process may be applied to Smith's information (filtering out all personal and salary data, for example) before the result is delivered to Sam; if Sam does works in the human resources department, then a different filter (or perhaps no filter) is applied to Smith's information. Techniques for controlling access in this manner are well known.

A distributed networking computing environment, however, introduces the need for having more sophisticated access policies in place. For example, it becomes necessary to view Sam in light of additional factors such as the device he is using and the location of that device. That is, while the access policy in place may permit Sam to see one set of information regarding Smith on his office computer attached to a secure local area network (LAN), it may be inappropriate for him to see some of the details of this same set of information on his cellular phone screen in a public airport. In this case, the target context (e.g. Sam is using a cell phone, and is connected using a cellular network) may be needed for correct policy enforcement. Pertinent factors in a target context include the user's identification, device type, network connection type, and any application-specific limitations of the application being executed. This target context may not be available to the server application handling requests for information from the employee directory (the true source of the data), and thus the server application is unable to enforce data policy correctly based on the requester's target context. For example, if the data for Smith is voluminous and the server application is unable to detect (as is highly likely) that Sam is using a cell phone with a relatively expensive wireless network connection, then this large amount of data will be transmitted to Sam in an expensive, time-consuming transmission—even though he will likely give up trying to view it because of the inherent display limitations of his end-user device.

While sufficient target context information for enforcing data policy is typically not available to a server application, in today's distributed environments this target context is often known to at least some portion of the distributed network such as the gateway into a wireless or wired network and other intermediaries (such as transcoding proxies or transcoding Web servers) in a complex delivery chain between the client and the server. Modifying these intermediaries to forward the target context to the server applications so that the server applications can enforce the data policy is not a viable solution in a distributed networking environment, however, as will now be discussed.

To further illustrate the problems of enforcing data policy in a distributed environment, suppose Sam is not an employee of the company to which the employee directory pertains, but is merely an Internet Web user accessing this directory through the company's Web site. Data policy based upon classifications of users, such as employee vs. non-employee, are common. While it may be appropriate to provide Sam with an external telephone number or e-mail address of an employee to facilitate communications, other information stored in the directory (such as the employee's department title or office location) may be inappropriate for providing to non-employees. Or, it may be desirable to restrict the volume of data provided to non-employees, for example to prevent advertisers from sending electronic mass mailings to the employees (by obtaining large numbers of e-mail addresses) or to prevent employment agencies from extracting a large portion of the company's stored phone book information. The true data source of this company's employee directory information is likely to be multiple data sources—that is, a collection of geographically dispersed directory servers in various divisions of the company, each having only a subset of the complete company-wide employee directory. For requests from users such as Sam who are interacting with the company's Web site, the Web application servicing these requests is then merely an information gatherer. Moreover, it is possible that these distributed directory servers may have different implementations whereby different information is stored for employees; they may use different formats for the data that is stored; and they may have different restrictions regarding the use of the data they contain (i.e. different data policies). For example, the sales division might allow external users such as Sam to see an employee's job title in order to facilitate customer service, but the manufacturing division may not permit this information to be seen for its employees.

Many other scenarios can be envisaged in which sophisticated data policies which account for many types of variable factors are necessary. For example, a company which supplies products may have multiple pricing structures, whereby other companies buying these products have various discounts applied based on their purchasing volume. In this situation, the data policy must use the relevant factors to apply the correct price for each purchaser's order.

When an application server servicing user requests has to gather data from diverse sources distributed throughout the network, and then assemble a single response to a request, the problems of enforcing data policy are compounded. The various (true) sources of the data may not have enough information to perform some types of policy enforcement. For example, if a data policy states that at most ten e-mail addresses or ten telephone numbers may be retrieved (in order to protect a company's resources, as in the scenario described above), each individual server has no way of knowing how may addresses or numbers it may release when it has no knowledge of how many addresses or numbers other servers are releasing.

Based on these factors, it would be advantageous to be able to apply data policy at an intermediate point in the delivery chain. As stated above, certain intermediaries have access to relevant target context. Examples of this type of intermediary are Web servers, transcoders, proxies, and gateways. In addition, because any necessary data gathering from multiple sources has already occurred before the data reaches the intermediary, an intermediary has the complete set of information to which the policy should be applied. However, in the current art, data policy is typically represented in application programming code that is specific to each type of data. It would be a monumental task to distribute this application-specific code to intermediaries, and execute and maintain the code in this dispersed fashion.

Accordingly, what is needed is a technique with which data policy can be efficiently enforced in a complex distributed network computing environment, incorporating many complex factors such as those described above.

SUMMARY OF THE INVENTION

An object of the present invention is to provide a technique for enforcing data policy efficiently in a complex distributed networking environment.

Another object of the present invention is to provide this technique whereby data policy is enforced at an intermediate point in the delivery chain from a server application to a client.

Yet another object of the present invention is to provide this technique by applying style sheets to documents encoded in tag languages such as the Extensible Markup Language.

A further object of the present invention is to provide this technique whereby a different data policy may be applied to each different tagged data item to provide maximum flexibility.

Still another object of the present invention is to provide this technique in a backward-compatible manner, such that existing style sheets continue to function properly.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer program product for use in a computing environment having a connection to a network, for efficiently enforcing data policy using style sheets. This technique comprises: providing an input document representing a response to a user request; providing a Document Type Definition (DTD) corresponding to the input document, wherein the DTD has been augmented with one or more references to one or more stored policy enforcement objects, wherein each of the stored policy enforcement objects enforces a data policy for an element of the input document; and executing an instrumented style sheet processor, wherein this execution further comprises: loading the augmented DTD; resolving each of the one or more references in the loaded DTD; instantiating the policy enforcement objects associated with the resolved references; and executing selected ones of the instantiated policy enforcement objects during application of one or more style sheets to the input document, wherein a result of this execution is an output document reflecting the execution.

Executing the instrumented processor may further comprise generating an output DTD corresponding to the output document.

The input document as well as the output document may be specified in an Extensible Markup Language (XML) notation.

The stored policy enforcement objects may further comprise code for overriding a method for evaluating the element of the input document, and executing selected ones of the instantiated policy enforcement objects may further comprise executing an overridden method.

The style sheets may be specified in an Extensible Stylesheet Language (XSL) notation. The method may be a value-of method of the XSL notation, and overriding the value-of method may be done by subclassing this value-of method. The overridden method may return an input value of the element of the input document or a changed version of the input value, or may return a null value.

Executing selected ones of the instantiated policy enforcement objects may further comprise may further comprise considering a target context of a user making said user request, or may further comprise determining whether an output DTD element in the output DTD will be generated for the element of the input document (where this determination then may further comprise considering a target context of a user making said user request). The determination may further comprise suppressing the output DTD element in the output DTD when the output DTD element is not to be generated.

The present invention will now be described with reference to the following drawings, in which like reference numbers denote the same element throughout.

BRIEF DESCRIPTION OF THE DRAWINGS

FIG. 3 depicts an example of a Document Type Definition (DTD) that has been augmented with data policy information, according to the preferred embodiment of the present invention;

FIG. 4 illustrates a simple output document resulting from a user's query of stored data, before application of data policy has occurred.

DESCRIPTION OF THE PREFERRED EMBODIMENT

Figure 1:
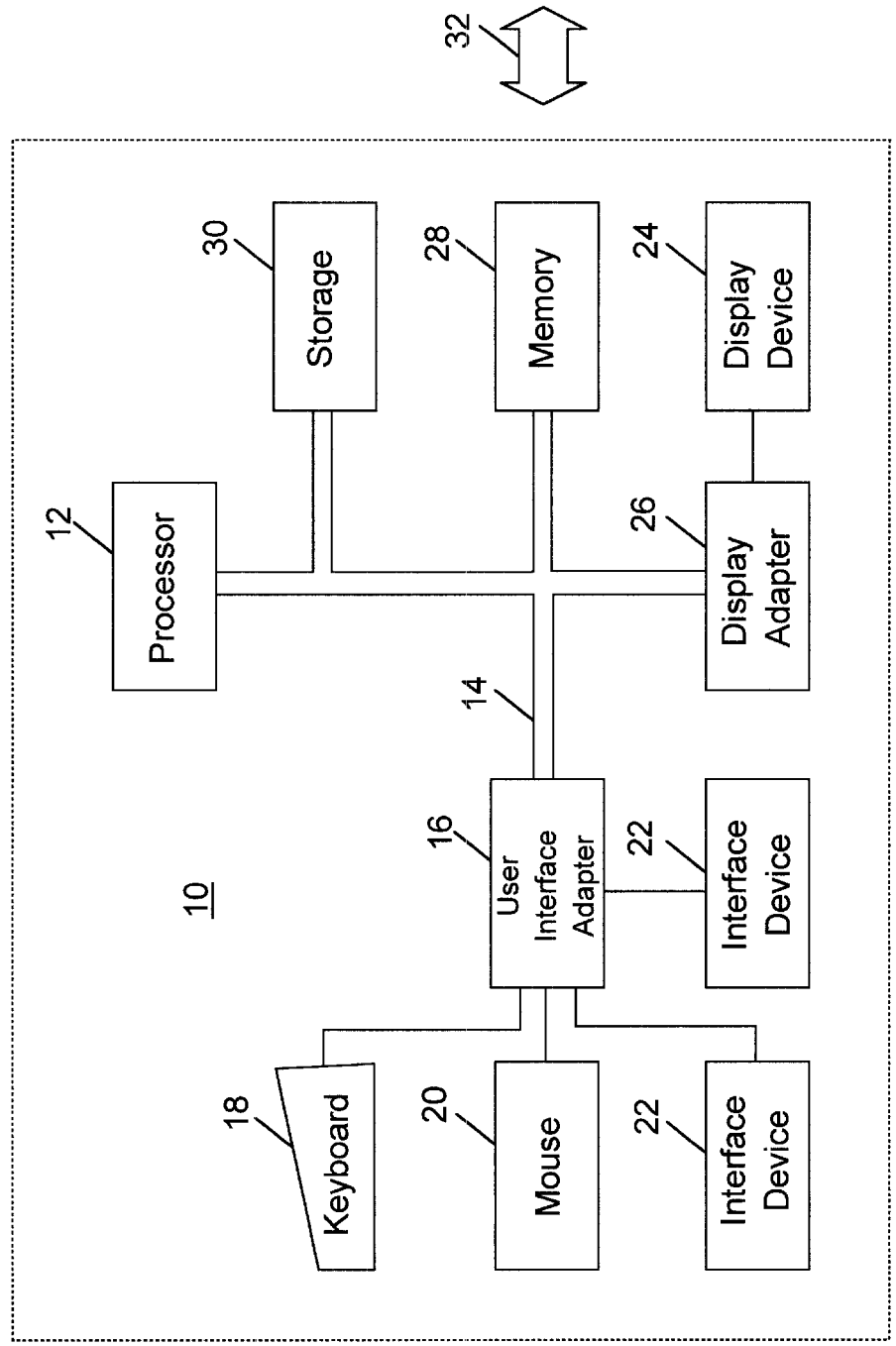
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 24. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
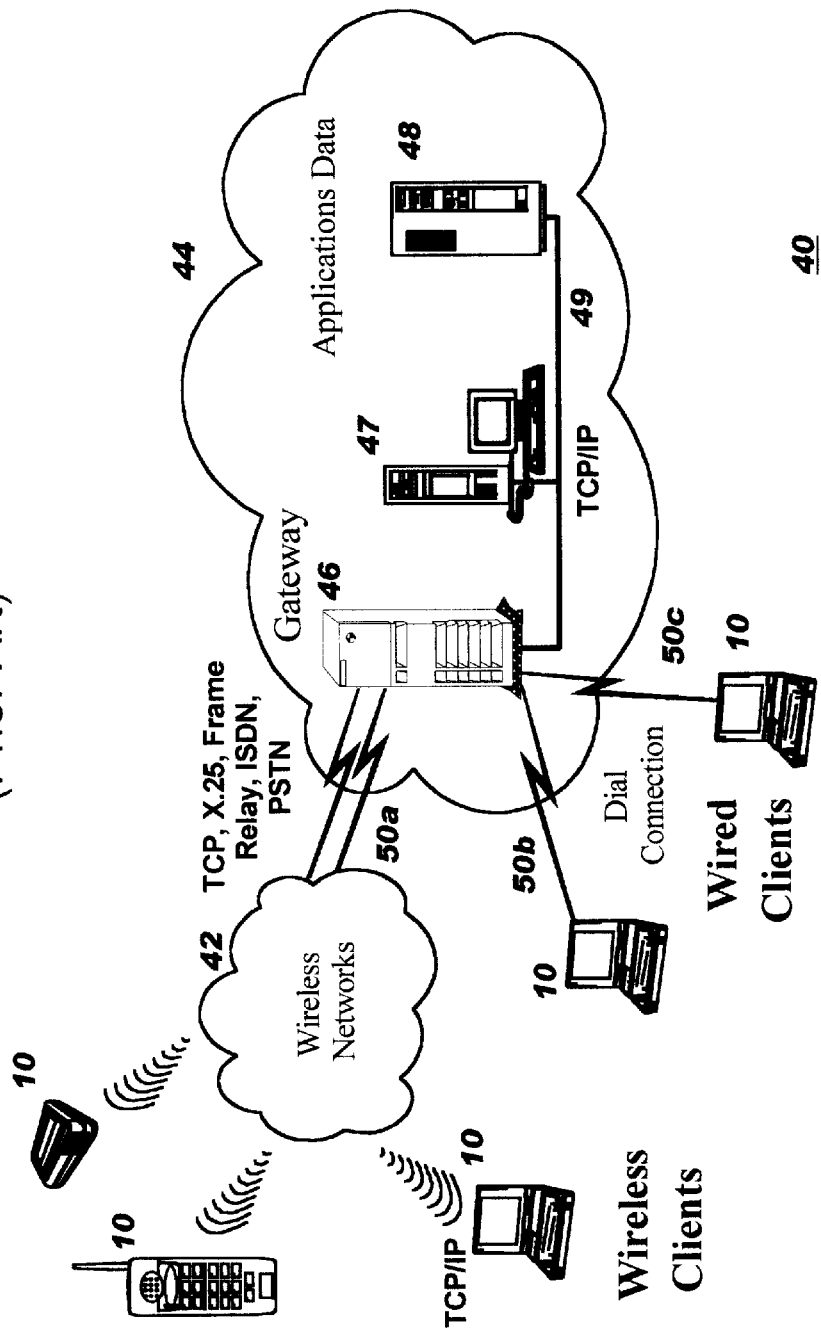
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of an intermediary such as gateway 46 (hereinafter referred to simply as an intermediary) from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A user of the present invention may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing (and optionally communication) capabilities. The remote server and the intermediary, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

In the preferred embodiment, the present invention is implemented as one or more computer software programs. The software may operate on an intermediary in a network, as one or more modules (also referred to as code subroutines, or "objects" in object-oriented programming) which are invoked upon request. The intermediary may be providing services in an Internet environment, in a corporate intranet or extranet, or in any other network environment. Alternatively, the present invention may execute on a server in a proper environment.

The present invention defines a novel technique for enforcing data policy in a distributed network computing environment using style sheet processing. Preferably, this processing occurs at an intermediary in the delivery chain between a client who has requested stored data and the server application which has retrieved the requested information. Intermediaries commonly apply various types of translations and/or transformations based upon target context. For example, the Extensible Markup Language (XML) is widely adopted as an industry standard for the publishing and exchange of data through networks such as the Internet. When data is being transmitted in the form of an XML document, a common translation is to reformat the document into a different markup language, where the target markup language is better suited to the target context. Suppose the requesting user Sam from the previously-discussed example has requested data from his cell phone over a wireless connection. In this case, the target context comprises the user Sam; his limited-function, constrained device, the wireless network connection; and the browser or other application software from which Sam issued his request. It may be determined that Sam's browser does not support XML, but does support WBXML ("Wireless Application Protocol Binary XML"), which is a compact binary representation of XML developed for the purpose of document presentation for users of wireless computing devices. Thus, the intermediary would perform an XML to WBXML translation, and send the resulting WBXML document to the requesting user Sam. A typical means of performing this type of translation, as well as many other translations and transformation, is by applying a style sheet to the input document.

In order to tailor document content for its target context, it is advantageous to be able to retrieve a particular style sheet (or sheets) that will provide a transformation that is most appropriate for the characteristics of this target context. U. S. patent application Ser. No. 09/287,988 (now U.S. Pat. No. 6,463,440), titled "Retrieval of Style Sheets from Directories Based Upon Partial Characteristic Matching" and assigned to the same assignee, discloses a technique for associating characteristics with style sheets, and retrieving an appropriate style sheet by specifying a pattern which includes one or more of the characteristics. The technique of this disclosure (hereinafter, "the referenced invention"), which is incorporated herein by reference, is preferably used with the present invention.

A "style sheet" is a specification of a style that is to be used when presenting a document. The style specification includes information such as the font and margins to be used, the formatting layout, and other types of information that indicate how the presented document should appear. Style sheets may also be utilized to describe transformations from one document type to another (e.g. from XML to WML) or as filters which describe transformations to reduce the amount of content while maintaining the original document type.

One type of style sheet is an XSL Style Sheet. XSL Style Sheets are style sheets specified in XSL, which is a particular style sheet language. "XSL" is an acronym for "Extensible Stylesheet Language". An XSL Style Sheet specifies how an XML document is to be transformed, resulting in a different document which may or may not maintain the original document type. (Refer to "Extensible Stylesheet Language (XSL), W3C Working Draft 21 April 1999", referred to hereinafter as "the XSL Specification", and "XSL Transformations (XSLT), Version 1.0, W3C Working Draft 9 July 1999", which are available on the Web from the World Wide Web Consortium, or "W3C", for more information on using XSL for formatting and transforming documents)

Style sheets include "template rule" constructs, which define an input pattern and a template (also known as an "action") to use in creating an output result tree fragment. When applying a style sheet, the patterns in the template rules are matched against the syntax of the source document. When a match is found with the pattern, an output document fragment is created according to the actions specified in the template (which may include processing additional elements in the source document beyond the matching element). The source document is parsed recursively, until no more matching patterns are found. The resulting document fragments are then aggregated to yield a complete output document. (For more information on this process, refer to section 2, "Tree Construction", in the XSL Specification.) It is this template rule matching and substitution of different document elements according to the actions in the matching rules that enables style sheets to transform documents.

Style sheets may be written to search for and extract a specific subset of the information contained in an XML document. Or, a style sheet might tailor the information so that it can be delivered to a particular device, transforming the document for the characteristics of the device (such as which browser will be used to render the document, the screen size of the device, whether the screen supports color or grayscale, etc.). These techniques are well known in the art. (While the term "document" is used herein when discussing encoded data and application of style sheets thereto, it is to be understood that the information on which a style sheet operates may represent any type of information, and is not limited to the traditional interpretation of the word "document". As one example, a style sheet may be used to process an encoded representation of records from a data repository which specify a company's sales data. As another example, a style sheet may be used to format employee information retrieved from a corporate database for presentation. For ease of reference, the term "document" will be used herein to refer to these diverse types of information.)

The present invention extends the use of style sheets, in order to provide a powerful and flexible means of enforcing data policy. According to the preferred embodiment, these data policies are defined by augmentation of an XML document's associated DTD. The data policy may be different from one tag to another within the document. The procedures for enforcing the data policy are not carried with the document, but instead are retrieved dynamically when the transforming intermediary processes the document with an XSL processor. The DTD for the XML document includes a specification of a Uniform Resource Identifier (URI) or Uniform Resource Locator (URL), hereinafter referred to using the term "URI" for ease of reference, for each applicable data policy. The XSL processor then retrieves the policy information as needed, using these URIs. In this manner, the network transmission cost of an XML document is minimized while still providing easy accessibility to the data policy.

For ease of reference, documents encoded in markup languages will be referred to hereinafter as "XML documents", although it is to be understood that the present invention applies to documents encoded in alternative notations as well. Similarly, style sheets will be referred to as "XSL style sheets", although the present invention is applicable to other style sheet notations having analogous functionality as XSL style sheets.

The preferred embodiment of the present invention will now be discussed in more detail with reference to FIGS. 3 through 7. A simple example will be used to illustrate the benefits as well as the implementation of the present invention. Suppose a publishing company maintains a database (or other repository) of information about the items in its catalog. One type of item in the catalog is books. Further suppose that the stored record for each book comprises its title, author, retail price, true cost, and the number currently in stock. FIG. 3 depicts an example of a DTD 300 that may be used to describe the data in the record for a book. As is well known in the art, a DTD is a definition of the structure of an XML document, and is encoded in a file which is intended to be processed, along with the file containing a particular XML document, by an XML parser. The DTD tells the parser how to interpret the document which was created according to that DTD. This DTD 300 includes entries for the title 350, author 360, retail price 370, cost 380, and quantity in stock 390.

This DTD 300 has been augmented with data policy information. According to the preferred embodiment of the present invention, data policy can be associated with a document's data structures by modifying the DTD for the document to specify the URI of each applicable policy. Three different data policies will be used to illustrate the book catalog example. The policy used for the book title, author, and retail price is to allow unrestricted access to these data items. Data policy information to enforce this unrestricted access policy (as well as any policies used with the present invention) is preferably stored in a directory database, such as an LDAP database. The stored policy can then be retrieved by sending a message to the database engine, specifying the URI of the desired information, as will be discussed in more detail below. An example URI that may be used to retrieve the "unrestricted" policy information for this example is shown at element 332. Note that XML parameter entity substitution has been used in this example DTD 300, whereby the relatively long URIs 312, 322, 332 are specified as the value associated with shorter entity names 311, 321, 331. These shorter names are then used within the attribute list declarations, such as "%unrestricted" 355 in the title declaration 350. This approach has the advantage of reducing the number of characters within the DTD (and thus the number of bytes transmitted through the network) when a URI is used repeatedly, and also makes the attribute list declarations more intuitive and easier to read. (As will be obvious, the URIs may alternatively be replicated throughout the DTD without deviating from the scope of the present invention.) Note that the URIs 312, 322, 332 have been depicted as relative distinguished names (RDNs) for the stored data policy information. These RDNs are simply a unique identifier for storing the object in a directory. Alternative storage techniques (and identifications thereof) may be used without deviating from the scope of the present invention.

Another policy used with the book example is to limit access to a book's true cost to the internal employees of the book publishing company. The URI for this policy has been given the entity name "internalonly" 311, and is specified 385 in the attribute list declaration for cost 380. The third policy of this example is used with the quantity in stock information. Suppose that for those users requesting book information who are retail purchasers, it is sufficient to provide a "Yes or No" indication as to whether the book is in stock, while business partners requesting information will be told the exact quantity in stock. Information for enforcing this policy, which has been given the entity name "restricted" 321, is stored at URI 322. The policy is associated with the stock 390 element by specifiying 395 the URI 322 through its entity name 321.

Since the DTD itself can be disjoint from the document with which it is used (i.e. by using a URI reference from the document to the stored DTD), this means that in many cases there is no added network overhead in the preferred embodiment solution of specifying applicable data policy URIs within the DTD. That is, the DTD will not need to be retrieved by any intermediaries between the client and server other than the intermediary at which the data policy application is performed. (And when the DTD is retrieved by that intermediary, it contains only URI references to stored policy rather than a full specification of data policy.)

The preferred embodiment solution of specifying a data policy URI within a data element's attribute list declaration allows one to encode the most complex arrangement possible, that being a different policy for each data element (even though this situation is likely never to occur in actual use). As can be seen from the example DTD in FIG. 3, the preferred embodiment uses standard DTD markups with a special convention. In this manner, processes unaware of the policy convention will still see totally valid XML syntax which passes all standard validation tests when the respective document contains policy markups. A beneficial side effect of this is that if the document generated by a data source uses a URI DTD reference (such as element 405 of document 400 in FIG. 4, which refers to the storage location of the example DTD 300 of FIG. 3), then an enterprise data policy administrator can cause data policy to be applied to such generated documents simply by modifying the referenced DTD (to add policy definitions, or perhaps change the policy definitions which have already been added). No change to the code which generates the XML source documents at the data source needs to be made.

By convention, the DTD policy markup of the preferred embodiment uses a fixed attribute (see, e.g., 354 of FIG. 3) from a policy namespace (see 352 of FIG. 3) to indicate the URI of the policy which is to be applied to an XML element. As is known in the art, using a namespace prefix enables differentiation among tags that might otherwise be considered duplicates. Setting a fixed value guarantees that the value of this attribute (such as the value 355 of attribute 353) will be available to the XSL processor whenever it processes the element (such as the title element 351).

FIG. 4 illustrates a simple output document resulting from a user's query of stored data, before application of data policy has occurred, where this document corresponds to the book catalog example which has been discussed. (The example DTD of FIG. 3 would then be used by an XSL processor, as described below, to apply the desired data policy before sending the resulting document to the requesting client.) Note that there is no policy markup nor any reference to policy in the document 400, and hence there is no policy-related overhead in transmitting a query response such as this document 400 through the network. Furthermore, as stated above, there was no need to modify the XML emitter of the query application at the data source.

According to this example, a user has requested information for a specific book title 410. The document 400 contains the information for this title 410 that was retrieved from the stored catalog repository. In addition to the title 410, this retrieved information includes an author 420, cost 430, retail price 440, and quantity in stock 450. As previously discussed, two of the data items in this document 400 have data policy which restricts the values that will be displayed to the requesting user, according to the present invention. These two data items are the cost 430 and stock 450 elements. Using the policy examples discussed with reference to FIG. 3, if the requesting user is a retail customer, the cost 430 will be suppressed from the output document sent to this user and the stock 450 will be conveyed as "Yes" (instead of "28") to indicate that this book is currently in stock. (Additionally, the preferred embodiment masks the existence of the cost element from view of this user. If the output of the policy application process is an XML document, this is done by suppressing the cost element in the corresponding output DTD, as will be described with reference to FIG. 6.) If the requesting user is an internal employee of the book publishing company, the true cost 430 will be indicated to this user. And, if the requesting user is a business partner, the stock 451 information will be indicated. The manner in which an XSL processor applies the data policy to yield these results according to the present invention will now be discussed. (Style sheet processing may perform additional changes to this document 400, such as formatting the book information into a predetermined layout or performing target-specific transformations unrelated to data policy, using techniques which are known in the art.)

Figure 5:
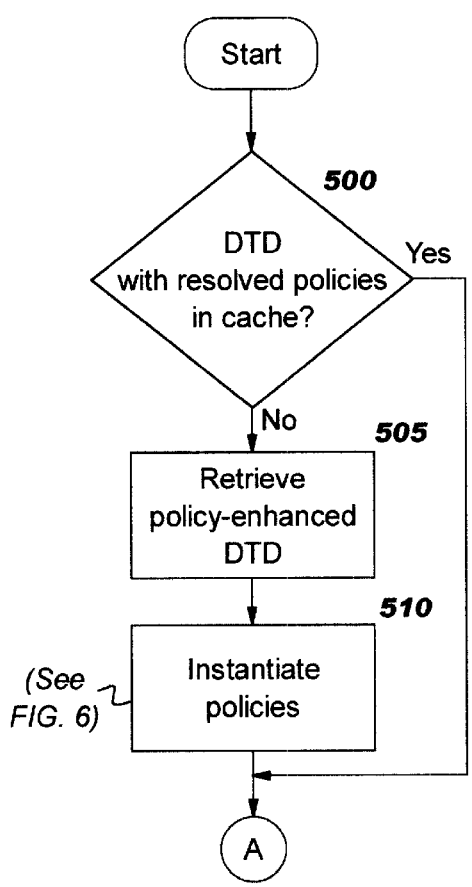
FIGS. 5 through 7 illustrate flow charts depicting the logic with which a preferred embodiment of the present invention may be implemented.
Figure 6:
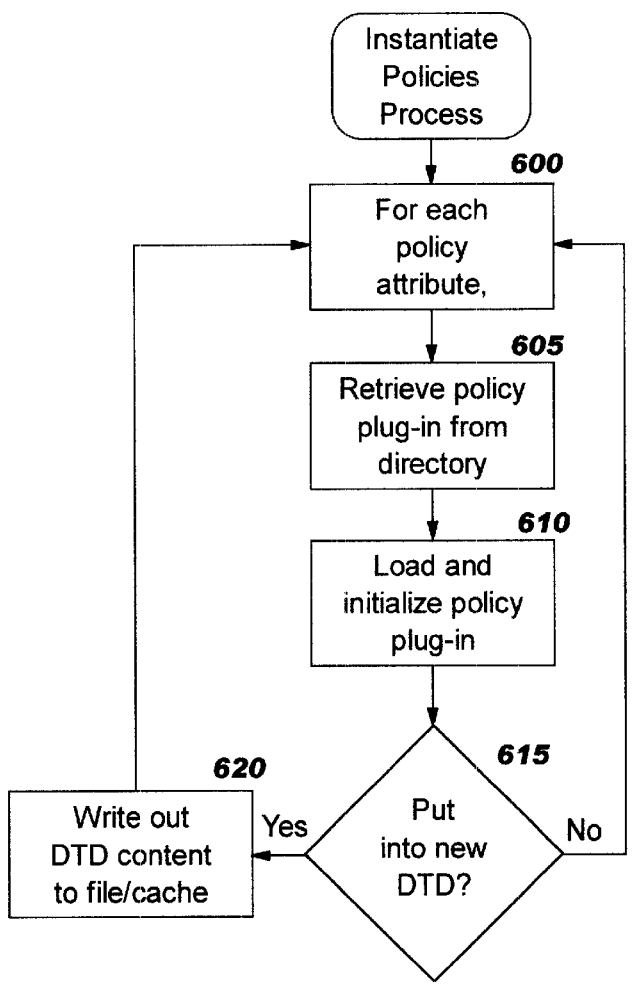
Figure 7:
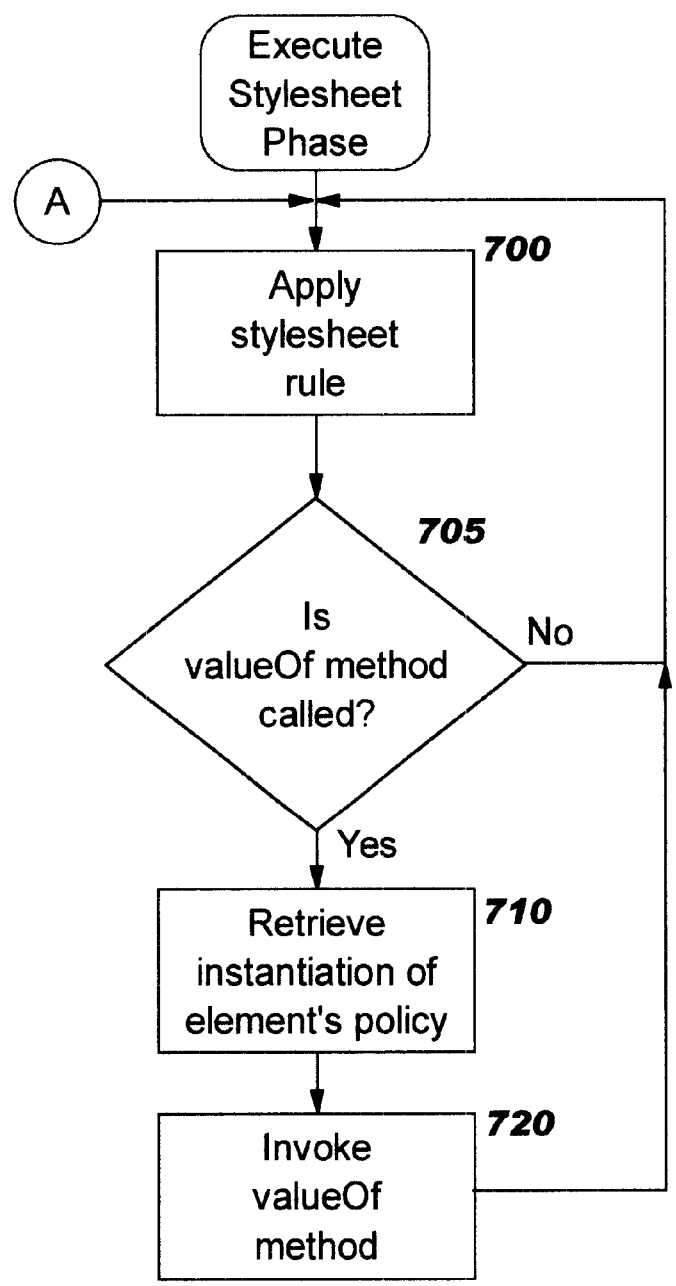

The preferred embodiment of the present invention uses an XSL processor that has been instrumented to apply data policy style sheet logic. FIGS. 5 through 7 illustrate flow charts depicting the additional logic with which this specially-instrumented XSL processor operates. (The logic of the existing XSL processing has not been shown. It will be obvious to one of skill in the art how to incorporate the logic of FIGS. 5 through 7 into the existing XSL processor logic.) The instrumentation logic of the preferred embodiment functions in two phases. In the first phase, the XSL processor scans the DTD to determine the structure of the input document (as in the prior art), and the instrumentation logic added for the present invention resolves the policy references found in the policy marked up DTD (such as policy reference 356 in DTD 300 of FIG. 3). In addition, if the output document of the XSL processor will be an XML document (and will thus have its own DTD), this first phase will build an output XML DTD in which any masked elements (such as the DTD information for cost 380, when the requesting user is a retail purchaser) have been removed. In the second phase, the XSL processor applies the style sheet to the document whose structure is now understood (from the processing of the first phase). The instrumentation added by the present invention intercepts references to values during this style sheet application process, and passes these intercepted values through to the policies instantiated in the first phase. It does this by overloading existing XSL processor methods. In particular, the preferred embodiment overloads the XSL "value-of" method. Preferably, this overriding will be done by subclassing the existing value-of method (where the technique for subclassing a method is well known in the art).

FIGS. 5 and 6 depict the instrumentation logic of the first phase, and FIG. 7 depicts the instrumentation logic for the second phase. The preferred embodiment assumes that data policy is stored in a repository (such as the LDAP directory referenced by policy URIs 310, 320, 330 of FIG. 3) as executable policy object code. For example, the stored code for implementing the "restricted" policy for the quantity in stock would have a method to override the value-of method using the following pseudocode:

---

IF requesting_user IN business_partners
    THEN RETURN stock
    ELSE
        IF stock > 0
            THEN RETURN "Yes"
            ELSE RETURN "No"

--- where the actual value 451 of the stock element is first retrieved by invoking the existing value-of method. (The stored policy object code is instantiated during Phase 1, and is executed partly in Phase 1 and partly in Phase 2, as will be discussed in more detail.)

In the general case, each stored policy object has a value-of method that performs whatever transformations are required on the corresponding data element value according to the data policy for that element. For policies such as "unrestricted" (described for the book title, author, and retail price of the example), this value-of method may simply return its input value without change.

Policy objects that perform transformations are preferably written for each specific element type to be transformed. The constructor method of the policy object is then passed the DTD information for the element, and the element it is being associated with, upon instantiation. Furthermore, in addition to the overriding value-of method described above, the policy object interface preferably supports an additional method that returns a true or false value (or a value of equivalent semantics) to indicate whether this policy instance will generate any output value(s) for a given set of target context characteristics (such as the identity of the requesting user, his device type and connection type, the application from which the request was generated, the user's location, any user preferences that have been stored for this user, etc.) (Refer to the referenced invention for more information on retrieving style sheets based upon characteristics associated therewith.) When the XSL style sheet output produces an XML output document of the same relative type, this method will be used to perform the masking of output DTD information for values that are being suppressed during the XSL processing. As described previously for the book catalog example, the cost value 430 will be suppressed from a final query result sent to a retail purchaser. To completely hide the existence of this information from the receiving user, this method prevents the DTD generated to correspond to the final query result document (not shown) from having an entry such as 380 of FIG. 3. Many examples can be imagined where the existence of a data item, and the specific formatting information of that item that a DTD element definition conveys, are preferably hidden from the receiver. The present invention uses this second policy object method to provide this advantageous benefit, as will be described with reference to FIG. 6.

FIG. 5 begins the processing of the phase one instrumentation of the preferred embodiment. At Block 500, a test is made to determine whether the DTD for the object being processed by the XSL processor has already been loaded into memory or cache, and whether any policy URI references have been resolved. If this test has a positive result, then phase one is complete, and the processing of FIG. 5 ends and phase 2 begins (see FIG. 7). (This would be the case if the processing of FIGS. 5 and 6 has already been executed for a particular DTD.) Otherwise, processing continues at Block 505, where the appropriate DTD is retrieved. Using the examples of FIGS. 3 and 4, the document being processed is document 400 of FIG. 4. The DTD reference 405 is located by the processing of Block 500, and Block 505 then uses this reference 405 to retrieve the DTD 300. Block 510 then retrieves (using the URIs such as 312, 322, and 332) and instantiates the policy objects referenced from the DTD. The processing of Block 510 is more fully described by FIG. 6. Upon completion of this retrieval and instantiation, phase one is complete and the processing of FIG. 5 ends.

FIG. 6 depicts the retrieval and instantiation process for data policy objects referenced by URIs in the DTD retrieved at Block 505. The logic of FIG. 6 is repeated for each data policy attribute in the DTD (such as attribute 356 of FIG. 3), as indicated by Block 600. Block 605 retrieves the data policy object (which is preferably executed as a "plug-in" to the XSL processor, wherein the plug-in concept is well known in the art) from a stored repository using its URI. Block 610 then loads and initializes this policy plug-in, which instantiates the code for the policy object.

Block 615 asks whether DTD information for the data element corresponding to this policy object should appear in the DTD being generated for the final query output result. According to the preferred embodiment, this comprises executing the second method of the policy object as described above (which may further invoke techniques of the referenced invention), which returns a true or false value. If the value is false, then control returns to Block 600 to process the next policy attribute. Otherwise, when a true value is returned, Block 620 writes the DTD information for the corresponding data element to a file, cache, or other storage location where the generated DTD is being composed. Control then returns to Block 600.

In a particular implementation of the present invention, it may be desirable to always write DTD information for data elements to an output DTD, or to never write this information (for example, if it is known in advance that documents are being created in a notation which does not use DTDs). It will be obvious how to modify Blocks 615 and 620 for these situations. In addition, the second method of the data policy objects may be omitted in such implementations where no dynamic decision is being made.

When FIG. 6 has completed for each policy object referenced from the DTD being processed, the full set of callable objects that may be used by the phase 2 processing for a particular input document is now available.

The processing of FIG. 7 is invoked when phase 1 has completed, and begins at Block 700 by applying a style sheet rule to the input document. When the pattern of a style sheet rule matches an element of the input document, Block 705 asks whether this template calls the existing XSL value-of method. If not, processing of the rule continues according to the prior art, and control returns to Block 700. Otherwise, Block 710 retrieves (i.e. obtains a pointer or reference to) the previously-instantiated data policy object for the data element which has matched the template rule. The overriding value-of method of this data policy object is executed at Block 720, performing any appropriate transformations that have been coded within this method. This process of applying style sheet rules to perform the novel data policy enforcement technique of the present invention is repeated by iterating Blocks 700 through 720 until the input document has been completely processed, after which the processing of FIG. 7 ends.

As has been demonstrated, the preferred embodiment of the present invention provides an easy-to-use, flexible approach for enforcing data policy. The data policy information may be different from one data element to another, and is specified by binding the data policy identifier (i.e. the URI where the policy is stored) to the data element in the document DTD. This technique minimizes policy-related overhead during network transmission, yet enables the policy information to be easily accessible to an XSL processor that has been modified with policy instrumentation. The present invention is backward compatible, permitting XML documents to be used by both XSL processors which have been modified to utilize policy instrumentation according to the present invention, as well as by XSL processors which have not been modified. (Such unmodified XSL processors simply perform the entity substitution of the data policy URIs within the DTD, but do not retrieve nor process the policy objects referred to by those URIs.)

A further advantage of the present invention is that no change is required in the style sheet that controls the transformation. The style sheet references to the value-of method remain unchanged. The present invention enforces data policy by overriding the code that is invoked upon encountering a value-of method invocation from the (unmodified) style sheet. (It would be possible, of course, to modify a style sheet to take advantage of the policy mark-up of the XML document if desired. For example, if a template rule for the stock item of the book catalog example executed, the value might be changed from "28" to "Yes" by the data policy object. The style sheet would not normally have expected a Yes/No value to be returned for this data item, and thus would have no processing to handle this case. The style sheet could be modified in this situation to perhaps generate ordering instructions when the value returned is "Yes", and some sort of "Try again later" text when the value returned is "No".)

In addition, the present invention handles a key security concern when XML to XML transforms take place, as is often the case when an XML output document is being requested from one business by another business. By enabling the data formats and/or policies (as well as data values) to be filtered out of a generated XML DTD (and an XML document, respectively), the disclosure of this information to the data target is prevented.

The present invention is neutral to the format of the data policy itself. What is required for enforcing a data policy is only that the policy can be accessed by a URI (such as the references to policy objects in an LDAP directory, as shown in FIG. 3) and, of course, that the policy is understood by the instrumentation enforcing that policy in the XSL processor. This has the additional benefit of longevity in solution implementation, since the implementation of the preferred embodiment will not need to be adjusted as new enterprise data policy requirements force a change in the policy encoding and instrumentation: the stored policies will then simply be updated to enforce the new policy requirements, and the references to the stored policy may be updated as necessary (e.g. if the updated policy is stored in a different location).

Although the preferred embodiment has been described as using XSL style sheets, style sheets in other notations may be used instead of XSL (e.g. Document Style Semantics and Specification Language, or DSSSL, which is an International Standard ISO/IEC 10179: 1996) without deviating from the inventive concepts of the present invention.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. A computer program product embodied on a computer readable medium readable by a computing system in a computing environment, for enforcing data policy using style sheet processing, comprising:
   computer-readable program code means for obtaining an input document representing a response to a user request;
   computer-readable program code means for obtaining a Document Type Definition (DTD) that defines elements of said input document, wherein an attribute of at least one element defined in said DTD references one of a plurality of stored policy enforcement objects, wherein more than one of said references may reference a single stored policy enforcement object and wherein each of said stored policy enforcement objects enforces a data policy for said referencing element or elements; and
   computer-readable program code means for executing an instrumented style sheet processor, wherein said instrumented processor further comprises:
      computer-readable program code means for loading said DTD;
      computer-readable program code means for resolving each of said one or more references to stored policy enforcement objects in said loaded DTD;
      computer-readable program code means for instantiating said policy enforcement objects associated with said resolved references; and
      computer-readable program code means for executing selected ones of said instantiated policy enforcement objects during application of one or more style sheets to said input document, wherein a result of said computer-readable program code means for executing is an output document wherein said data policy for said referencing elements that appear in said input document is thereby reflected.

2. The computer program product according to claim 1, wherein said instrumented processor further comprises computer-readable program code means for generating an output DTD corresponding to said output document.

3. The computer program product according to claim 1, wherein said input document is specified in Extensible Markup Language (XML) notation.

4. The computer program product according to claim 3, wherein said output document is specified in said XML notation.

5. The computer program product according to claim 2, wherein each of said instantiated policy enforcement objects further comprises computer-readable program code means for determining whether an output DTD element in said output DTD will be generated for said referencing element of said input document, and if not, for suppressing said output DTD element in said output DTD.

6. The computer program product according to claim 5, wherein said computer-readable program code means for determining further comprises computer-readable program code means for considering a target context of a user making said user request.

7. The computer program product according to claim 1, wherein said stored policy enforcement objects further comprise computer-readable program code means for overriding a method for evaluating said referencing element of said input document, and wherein said computer-readable program code means for executing further comprises computer-readable program code means for executing said computer-readable program code means for overriding, for each of said referencing elements that appear in said input document.

8. The computer program product according to claim 7, wherein said style sheets are specified in an Extensible Stylesheet Language (XSL) notation.

9. The computer program product according to claim 8, wherein said method is a value-of method of said XSL notation, and wherein said computer-readable program code means for overriding said value-of method is by subclassing said value-of method.

10. The computer program product according to claim 8, wherein said overridden method may return an input value of said element of said input document or a changed version of said input value, or may return a null value.

11. The computer program product according to claim 1, wherein said computer-readable program code means for executing further comprises computer-readable program code means for considering a target context of a user making said user request.

12. A system for enforcing data policy using style sheet processing in a computing environment, comprising:
   an input document representing a response to a user request;
   a Document Type Definition (DTD) that defines elements of said input document, wherein an attribute of at least one element in said DTD references one of a plurality of stored policy enforcement objects, wherein more than one of said references may reference a single stored policy enforcement object and wherein each of said stored policy enforcement objects enforces a data policy for said referencing element or elements; and
   an instrumented style sheet processor, wherein said instrumented processor further comprises:
      means for loading said DTD;
      means for resolving each of said one or more references to stored policy enforcement objects in said loaded DTD;
      means for instantiating said policy enforcement objects associated with said resolved references; and
      means for executing selected ones of said instantiated policy enforcement objects during application of one or more style sheets to said input document, wherein a result of said means for executing is an output document wherein said data policy for said referencing elements that appear in said input document is thereby reflected.

13. The system according to claim 12, wherein said instrumented processor further comprises means for generating an output DTD corresponding to said output document.

14. The system according to claim 12, wherein said input document is specified in an Extensible Markup Language (XML) notation.

15. The system according to claim 14 wherein said output document is specified in said XML notation.

16. The system according to claim 13, wherein each of said instantiated policy enforcement objects further comprises means for determining whether an output DTD element in said output DTD will be generated for said referencing element of said input document, and if not, for suppressing said output DTD element in said output DTD.

17. The system according to claim 16, wherein said means for determining further comprises means for considering a target context of a user making said user request.

18. The system according to claim 12, wherein said stored policy enforcement objects further comprise means for overriding a method for evaluating said referencing element of said input document, and wherein said means for executing further comprises means for executing said means for overriding, for each of said referencing elements that appear in said input document.

19. The system according to claim 18, wherein said style sheets are specified in an Extensible Stylesheet Language (XSL) notation.

20. The system according to claim 19, wherein said method is a value-of method of said XSL notation, and wherein said means for overriding said value-of method is by subclassing said value-of method.

21. The system according to claim 19, wherein said overridden method may return an input value of said element of said input document or a changed version of said input value, or may return a null value.

22. The system according to claim 12, wherein said means for executing further comprises means for considering a target context of a user making said user request.

23. A method for enforcing data policy using style sheet processing in a computing environment, comprising the steps of:

providing an input document representing a response to a user request;

providing a Document Type Definition (DTD) that defines elements of said input document, wherein an attribute of at least one element defined in said DTD references one of a plurality of stored policy enforcement objects, wherein more than one of said references may reference a single stored policy enforcement object and wherein each of said stored policy enforcement objects enforces a data policy for said referencing element or elements; and executing an instrumented style sheet processor, wherein said executing step further comprises the steps of:
loading said DTD;
resolving each of said one or more references to stored policy enforcement objects in said loaded DTD;
instantiating said policy enforcement objects associated with said resolved references; and
executing selected ones of said instantiated policy enforcement objects during application of one or more style sheets to said input document, wherein a result of said executing step is an output document wherein said data policy for said referencing elements that appear in said input document is thereby reflected.

24. The method according to claim 23, wherein said step of executing an instrumented processor further comprises the step of generating an output DTD corresponding to said output document.

25. The method according to claim 23, wherein said input document is specified in an Extensible Markup Language (XML) notation.

26. The method according to claim 25, wherein said output document is specified in said XML notation.

27. The method according to claim 24, wherein the step of executing selected ones of said instantiated policy enforcement objects further comprises the step of determining whether an output DTD element in said output DTD will be generated for said element of said input document, and if not, suppressing said output DTD element in said output DTD.

28. The method according to claim 27, wherein said determining step further comprises the step of considering a target context of a user making said user request.

29. The method according to claim 23, wherein said stored policy enforcement objects further comprise an overridden method for evaluating said referencing element of said input document, and wherein said step of executing selected ones of said instantiated policy enforcement objects further comprises the step of executing said overridden method, for each of said referencing elements that appear in said input document.

30. The method according to claim 29, wherein said style sheets are specified in an Extensible Stylesheet Language (XSL) notation.

31. The method according to claim 30, wherein said method is a value-of method of said XSL notation, and wherein said step of overriding said value-of method is done by subclassing said value-of method.

32. The method according to claim 30, wherein said overridden method may return an input value of said element of said input document or a changed version of said input value, or may return a null value.

33. The method according to claim 23, wherein said executing selected ones of said instantiated policy enforcement objects step further comprises the step of considering a target context of a user making said user request.

* * * * *